United States Patent
Shin et al.

(10) Patent No.: US 8,750,251 B2
(45) Date of Patent: Jun. 10, 2014

(54) METHOD AND APPARATUS FOR IMPLEMENTING NETWORK CODING IN A LONG TERM EVOLUTION ADVANCED SYSTEM

(76) Inventors: Sung-Hyuk Shin, Northvale, NJ (US); Philip J. Pietraski, Huntington Station, NY (US); Mohammed Sammour, Amman (JO); Erdem Bala, Farmingdale, NY (US)

(*) Notice: Subject to any disclaimer, the term of this patent is extended or adjusted under 35 U.S.C. 154(b) by 1041 days.

(21) Appl. No.: 12/499,964

(22) Filed: Jul. 9, 2009
(Under 37 CFR 1.47)

(65) Prior Publication Data
US 2010/0173659 A1  Jul. 8, 2010

Related U.S. Application Data

(60) Provisional application No. 61/089,325, filed on Aug. 15, 2008.

(51) Int. Cl.
*H04W 4/00* (2009.01)
*H04B 7/04* (2006.01)

(52) U.S. Cl.
CPC ............ *H04B 7/0478* (2013.01); *H04B 7/0452* (2013.01); *H04B 7/0456* (2013.01)
USPC ......... 370/334; 370/329; 370/332; 455/562.1

(58) Field of Classification Search
CPC ... H04B 7/0456; H04B 7/0452; H04B 7/0478
USPC ............... 370/302, 328, 329, 330, 332, 334; 375/141, 219, 260, 267, 295, 299, 338, 375/347; 455/63.1, 278.1, 562.1
See application file for complete search history.

(56) References Cited

U.S. PATENT DOCUMENTS

| | | | |
|---|---|---|---|
| 7,436,188 B2 * | 10/2008 | Taenzer | 324/613 |
| 2007/0155336 A1 | 7/2007 | Nam et al. | |
| 2008/0037669 A1 * | 2/2008 | Pan et al. | 375/260 |
| 2008/0043874 A1 * | 2/2008 | Lee et al. | 375/267 |
| 2008/0227422 A1 * | 9/2008 | Hwang et al. | 455/278.1 |
| 2008/0267142 A1 * | 10/2008 | Mushkin et al. | 370/338 |

(Continued)

OTHER PUBLICATIONS

Interdigital Communications, LLC, "Efficient Downlink Control Signaling for MU-MIMO," 3GPP TSG RAN WG1 Meeting #53, R1-081712 (May 5-9, 2008).

Interdigital Communications, LLC, "PDCCH MIMO Format Options for E-UTRA," 3GPP TSG RAN WG1 Meeting #53, R1-081713 (May 5-9, 2008).

(Continued)

*Primary Examiner* — Hassan Phillips
*Assistant Examiner* — Ajay Cattungal
(74) *Attorney, Agent, or Firm* — Volpe and Koenig, P.C.

(57) ABSTRACT

A method and apparatus for applying network coding in multi-user (MU) multiple-input multiple-output (MIMO) control signaling are disclosed. After a pair of wireless transmit/receive units (WTRUs) transmit channel state information (CSI) to an evolved Node-B (eNodeB), each of the WTRUs receive network coded information from the eNodeB, including the CSI transmitted by both of the WTRUs, and decode the network coded information. The WTRUs transmit CSI on a scheduled basis, and store CSI that was previously transmitted. Each of the WTRUs measure the amount of time that pass since they transmitted CSI, and use the transmitted CSI to decode the network coded information on the condition that the measured time does not exceed a predetermined threshold. If the measured time exceeds the predetermined threshold, the stored CSI is used to decode the network coded information.

21 Claims, 3 Drawing Sheets

(56) References Cited

U.S. PATENT DOCUMENTS

| | | | |
|---|---|---|---|
| 2009/0190528 A1* | 7/2009 | Chung et al. | 370/328 |
| 2009/0232245 A1* | 9/2009 | Lakkis | 375/267 |
| 2009/0274230 A1* | 11/2009 | Heath, Jr. et al. | 375/260 |
| 2009/0322613 A1* | 12/2009 | Bala et al. | 342/373 |
| 2009/0323849 A1* | 12/2009 | Bala et al. | 375/267 |
| 2010/0035555 A1* | 2/2010 | Bala et al. | 455/63.1 |
| 2010/0173659 A1* | 7/2010 | Shin et al. | 455/500 |
| 2011/0019637 A1* | 1/2011 | Ojala et al. | 370/329 |

OTHER PUBLICATIONS

Third Generation Partnership Project, "Technical Specification Group Radio Access Network; Evolved Universal Terrestrial Radio Access (E_UTRA); Multiplexing and Channel Coding (Release 8)", 3GPP TS 36.212, V8.3.0, (May 2008).

Third Generation Partnership Project, "Technical Specification Group Radio Access Network; Evolved Universal Terrestrial Radio Access (E_UTRA); Multiplexing and Channel Coding (Release 8)", 3GPP TS 36.212, V8.7.0, (May 2009).

* cited by examiner

METHOD AND APPARATUS FOR IMPLEMENTING NETWORK CODING IN A LONG TERM EVOLUTION ADVANCED SYSTEM

CROSS REFERENCE TO RELATED APPLICATIONS

This application claims the benefit of U.S. Provisional Application No. 61/089,325 filed Aug. 15, 2008, which is incorporated by reference as if fully set forth.

FIELD OF INVENTION

This application is related to wireless communications.

BACKGROUND

One of the requirements for long term evolution advanced (LTE-A) is to increase spectral efficiency over existing long term evolution (LTE) wireless systems. In order to fulfill the requirement, there are several candidate techniques considered for LTE-A, including single-user/multi-user (SU/MU) multiple-input multiple-output (MIMO), multi-site MIMO, relaying, and the like. Such techniques typically require control signaling associated with the respective technique in uplink (UL), downlink (DL), or both. For example, in a closed loop MIMO system, (e.g., a precoding MIMO system), a receiver sends channel state information (CSI), (i.e., a precoding matrix indicator (PMI)), in a control channel to a transmitter. Then, the transmitter signals to the receiver the precoding vector or matrix information which it uses for transmission precoding. Since this overhead signaling causes spectral efficiency to be reduced, it is desirable to enhance the control signaling technique.

In LTE-A, there may be some cases, techniques, or applications where there is information exchanged between wireless transmit receive units (WTRUs), and evolved Node-Bs (eNodeBs), or relays. For example, in multi-cell cooperative MIMO or MU MIMO in DL, it would be beneficial in the receiver processing if WTRUs exchange their CSI with each other, or if the eNodeB transmits to each of the WTRUs the precoding vectors or matrices applied not only for the respective WTRU but also for other WTRUs, so that each of the WTRUs can use all of the precoding vectors or matrices. However, in this case, the signaling overhead with the legacy LTE signaling scheme may be too excessive to implement.

Thus, it is desired to apply the network coding model in few technology components considered for LTE-A. In order to make the signaling more efficient, the network coding is applied to MIMO related control signaling.

Network coding has been considered as a particular in-network data processing technique that exploits the characteristics of the broadcast communication channel, in order to increase the capacity of the throughput of the network.

FIG. 1 depicts a canonical example of network coding. A source, S, sends data, b1 and b2, to nodes, T and U, respectively, each of which multicasts the received data to other nodes, W, Y and Z. At node W, the received data, b1 and b2, are encoded using network coding and forwarded to node X after applying an XOR operation. Node X then receives the network coded data, b1⊕b2, and multicasts a copy of the network coded data to nodes Y and Z.

Through this network information flow, the nodes Y and Z may receive both b1 and b2 without additional channel resources.

Network coding may be applied in MU MIMO control signaling. FIG. 2 shows a conventional wireless communication system 200 including an eNodeB 205 and a plurality of WTRUs $210_1$ and $210_2$.

In MU MIMO, multiple WTRUs 210 are paired (or scheduled), and they are served simultaneously by the eNodeB 205 via MU spatial multiplexing MIMO. That is, the eNodeB 205 simultaneously transmits to the WTRUs 210 through a MU MIMO technique, such as zero-forcing (ZF) MU MIMO. In this case, a signal intended to one of the (paired) WTRUs 210 would be interference to the receiver of another WTRU 210, unless orthogonality of the signals is not maintained at the receiver. To eliminate such interference at a paired WTRU receiver, it is desirable for the eNodeB 205 to signal the beamforming vectors used in MU MIMO to the respective paired WTRUs 210. Regarding the selection of paired WTRUs 210, the eNodeB 205 typically selects WTRUs 210 experiencing similar channel quality, but having CSI that is uncorrelated to each other.

In DL MU MIMO, (e.g., ZF MU MIMO or unitary based MU MIMO), the individual paired WTRUs $210_1$ and $210_2$ typically feed back their own CSI, in a form of codebook, PMI, or quantized CSI, to the eNodeB 205. Upon reception of the CSI, the eNodeB 205 determines the beamforming (BF) vectors or precoding matrices used for MU MIMO transmission, and then the eNodeB 205 uses two separate physical downlink control channels (PDCCHs) $215_1$ and $215_2$ to separately signal the BF vectors, h1 and h2, to the WTRUs $210_1$ and $210_2$, respectively.

FIG. 2 is an example of signaling of CSI or PMI considered in MU MIMO. Even though h1 and h2 represent the beamforming vectors, they can also represent CSI, since the BF vectors are derived from the CSI. In some cases, the CSI may be deduced from the BF vectors. Accordingly, the BF vectors and the CSI may be interchangeable with each other.

In order for each WTRU 210 to perform MU interference cancellation effectively at its receiver, it is desirable for the individual WTRU 210 to also have access to the BF vectors of the other WTRUs 210. To do that, the eNodeB 205 needs to send all of the BF vectors h1 and h2 to each of the WTRUs 210. This causes the signaling overhead to be increased by the number of interfering WTRUs, (i.e., number of paired WTRUs).

Therefore, it is desirable to have efficient control signaling mechanisms using the concept of networking.

SUMMARY

A method and apparatus for applying network coding in MU MIMO control signaling are disclosed. After a pair of WTRUs transmit CSI to an eNodeB, each of the WTRUs receive network coded information from the eNodeB, including the CSI transmitted by both of the WTRUs, and decode the network coded information. The WTRUs transmit CSI on a scheduled basis, and store CSI that was previously transmitted. Each of the WTRUs measure the amount of time that pass since they transmitted CSI, and use the transmitted CSI to decode the network coded information on the condition that the measured time does not exceed a predetermined threshold. If the measured time exceeds the predetermined threshold, the stored CSI is used to decode the network coded information.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

When referred to hereafter, the terminology "evolved Node-B (eNodeB)" includes but is not limited to a base station, a site controller, an access point (AP), or any other type of interfacing device capable of operating in a wireless environment.

The control signaling mechanism used by the wireless communication system 200 may be improved by using network coding as described below.

Figure 1:
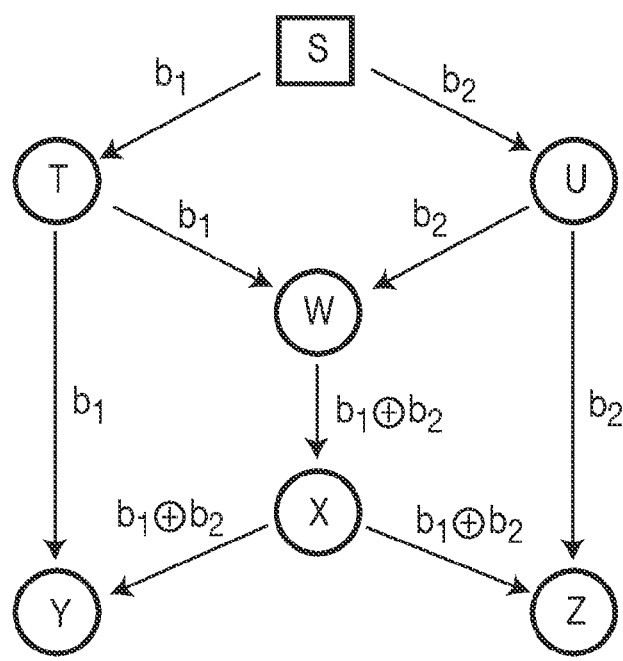
FIG. 1 shows a canonical example of network coding.
Figure 2:
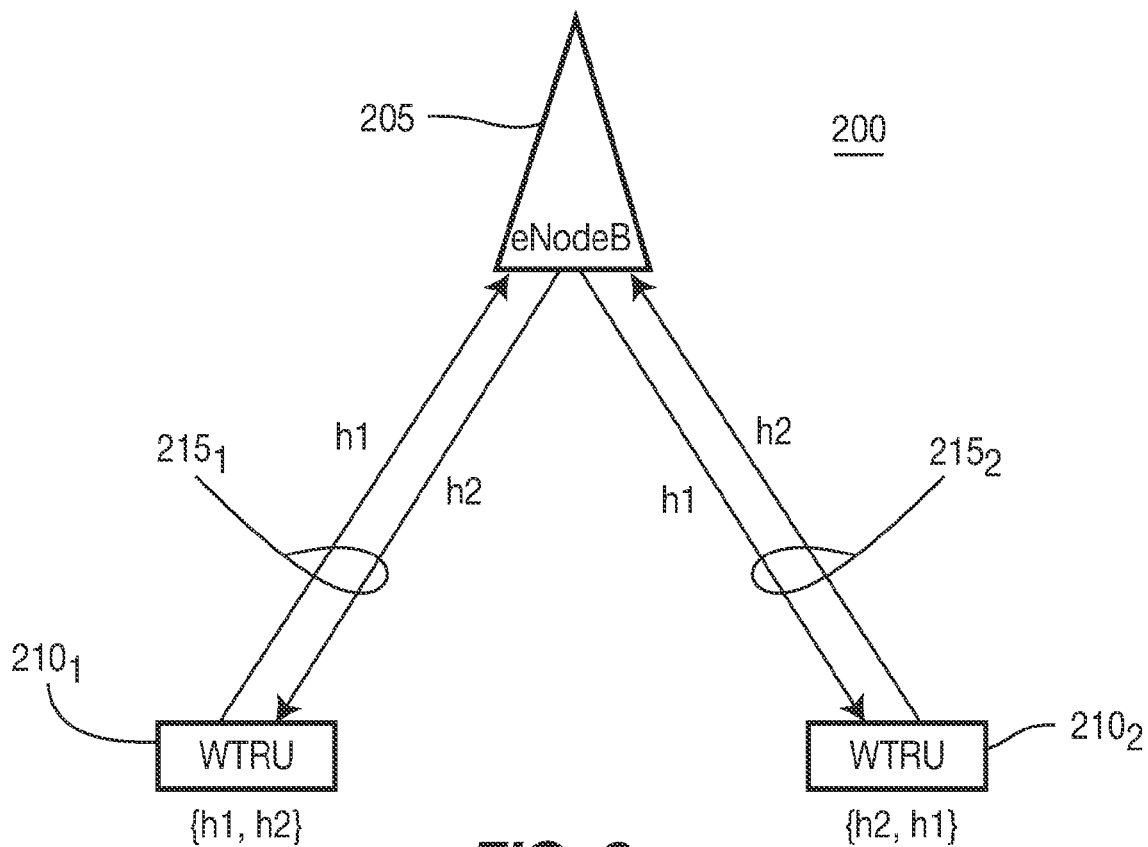
FIG. 2 is a conventional control signaling in DL MU MIMO.
Figure 3:
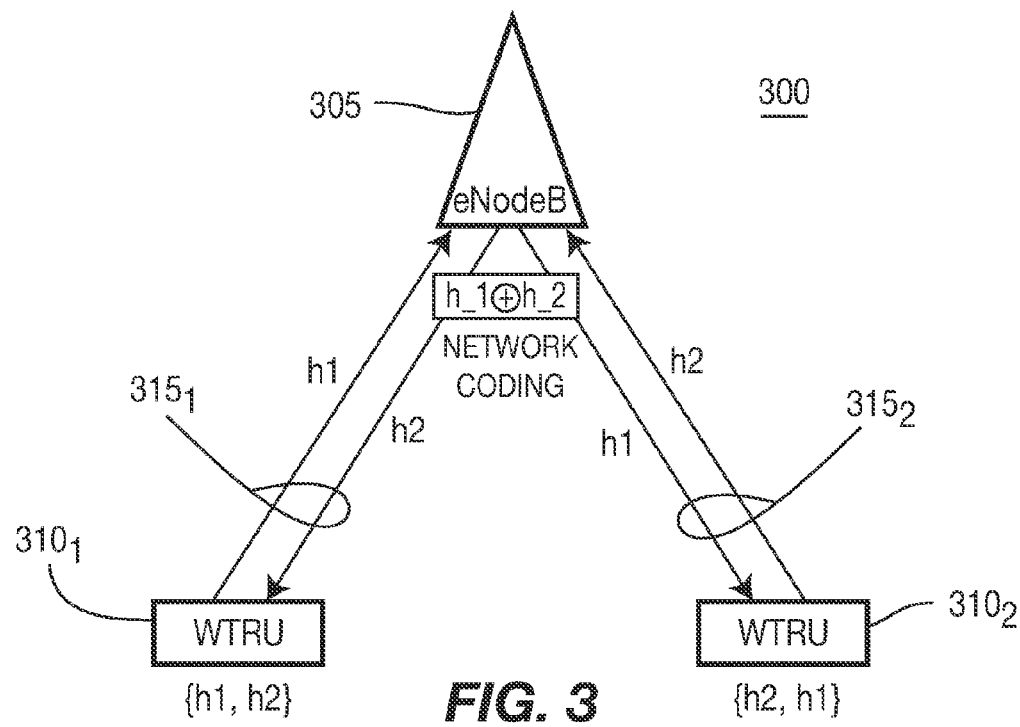
FIG. 3 shows an example of applying network coding in DL MU MIMO control signaling in a wireless communication system including an eNodeB and a plurality of WTRUs.

FIG. 3 shows a wireless communication system 300 including an eNodeB 305 and a plurality of WTRUs $310_1$ and $310_2$. Based on channel information which includes a first BF vector or precoding matrix, received from the WTRUs $310_1$ and $310_2$, the eNodeB 305 determines the BF vectors or precoding matrices, denoted as h1 and h2, for MU MIMO transmission for the two WTRUs 310 and then performs network coding of the BF vectors or precoding matrices, h1 and h2, as depicted below, for example, by Equation (1).

$$\text{network\_coded\_precoding\_vector} = h1 \oplus h2 \quad \text{Equation (1)}$$

In this case, consider the XOR operation as an example of network coding, but other network coding technique methods may be used to jointly encode h1 and h2. The network coding may be done in either a higher layer (L2/3), or a physical layer (L1). The eNodeB 305 uses two separate control channels, (e.g., PDCCHs), $315_1$ and $315_2$ to signal the resulting network coded precoding vectors to the WTRUs $310_1$ and $310_2$. Alternatively, a common control channel may be used to signal to a group of paired WTRUs. In this case, a group identity (ID), (e.g., a group radio network temporary ID (G-RNTI)), may be used for the common control channel whose cyclic redundancy check (CRC) parity bits are scrambled with the G-RNTI. In-band signaling such as layer 2 (L2)/layer 3 (L3) signaling may also be used.

In LTE PDCCHs, the downlink control information (DCI) format 1D, which is used for the compact scheduling of one PDSCH codeword, contains the precoding information field, (i.e., transmitted precoding matrix indicator (TPMI)), for MU MIMO transmission, where the TPMI indicates which codebook index is used by the eNodeB 305. The codebook index corresponds to a precoding matrix/vector selected from the codebook defined in the standards (e.g., TS 36.211) where the precoding matrix selection is based on PMI(s) reported by the WTRUs 310.

Let's assume that the number of antenna ports at the eNodeB 305 is four. In this case, the number of bits for TPMI information is 4, as specified in TS 36.212. In a given subframe in MU MIMO, for example, the precoding matrices, h1 and h2, for the WTRUs $310_1$ and $310_2$, respectively, which are actually represented by the corresponding codebook indexes, are h1=[1 0 0 0] and h2=[0 1 0 1] in a (4-bit) binary form. Using the XOR operation as an example of network coding, the network coded precoding matrix/vector is network_coded_precoding_vector=h1⊕h2=[1 1 0 1], which is transmitted to each WTRU 310 via PDCCH.

Each WTRU 310 decodes the received code, (e.g., h1⊕h2), to extract, (or recover), the necessary precoding vector, (i.e., channel), information. In decoding, the WTRUs 310 may use the side-information, (i.e., the channel information that includes the BF vector or precoding matrix that was sent to the eNodeB 305), available at the receiver. For instance, the WTRU $310_1$ uses the side-information h1 available to extract h2 from the received h1⊕h2 such that h2=h1⊕(h1⊕h2). Similarly, the WTRU $310_2$ uses the side-information h2 available to extract h1 from h1⊕h2 such that h1=(h1⊕h2)⊕h2. As a result, each WTRU 310 may have both of the precoding vectors, (i.e., channel information), h1 and h2, which are needed at the receiver to process MU MIMO data transmission.

Even though, in FIG. 3, it is exemplified to indicate that two WTRUs 310 are involved in MU MIMO, it may be generalized to more than two WTRUs 310.

The control information may be other than MIMO relevant information, such as radio bearer (RB) allocation, channel quality indicator (CQI), grant, transmit power control (TPC) command, positive acknowledgment (ACK) or negative acknowledgment (NACK), and the like.

WTRU grouping for efficient signaling will now be described. In order to achieve signaling efficiency, the WTRUs are grouped or paired together, (e.g., every two or four WTRUs 310 to form a group, depending on how many MIMO codewords or MIMO schemes are involved). Such grouping is performed via signaling at L1, or at L2/3). This means that N/2 signaling elements are sent to N WTRUs 310, which results in N/2 savings. Thus, control signaling overhead, (e.g., BF vectors, precoding matrix, or CSI), is reduced in MU MIMO using the network coding concept. Otherwise, the eNodeB 305 may need to signal all of the individual control information to each relevant WTRU 310.

Referencing or timing aspects also need to be considered. Referring to FIG. 3, the WTRU $310_1$ utilizes the latest available side information, (i.e., h1), that it has sent to the eNodeB 305 in order to extract h2. In order to know which h1 was used by the network 300 to create h1⊕h2, any one or more of the following methods are used.

In a first method, the WTRU $310_1$ measures the time, (e.g., number of frames), passed since it has sent the latest h1 to the eNodeB 305. If the time passed is greater than a certain threshold, then the WTRU $310_1$ utilizes the latest h1 in order to extract h2 from h1⊕h2. If not, then the WTRU $310_1$ utilizes the h1 that was included in the previously transmitted channel information just before the channel information including the latest h1 was sent, (hence, the WTRU $310_1$ stores at least one previously sent value of h1 in addition to the latest h1 it sent), so that the transmitter, (i.e., eNodeB), and the receiver, (i.e., WTRU), are in synch in terms of the precoding/BF vector in use. In order to improve robustness, the WTRU $310_1$ may utilize the hybrid automatic repeat request (HARQ) ACK/NACK feedback in order to determine whether or not an h1 that it sent was actually received by the eNodeB 305, and only utilize the values whose reception has been confirmed by the eNodeB 305.

In a second method, the eNodeB 305 includes additional information that may be used by the WTRU 310 to determine which version of h1 was used by the network to create h1⊕h2. One or more of the following may be used:

1) An explicit identifier, e.g., version number or sequence number, which is synchronized across the eNodeB 305 and the WTRUs 310 involved.

2) A checksum or another function of h1 and h2. In addition to the network coded version h1⊕h2, the eNodeB 305 provides another, (possibly network coded), function, (e.g., a checksum computed on the concatenation of h1 and h2). The WTRU $310_1$ first extracts h2 based on the received h1⊕h2, (i.e., based on the network coded version), and the side information h1. The WTRU $310_1$ then utilizes the other function or checksum to verify that h2 was computed correctly. If h2 is not computed correctly, then the WTRU $310_1$ attempts to recompute h2 using other versions of h1 that were stored earlier.

Alternatively, applying network coding in multi-cell cooperative network MIMO control signaling is described, which may be extended to multi-cell cooperative network MIMO.

In one method, multi-cell cooperative network MIMO may be implemented where each WTRU 310 may communicate with multiple cells, (i.e., eNodeB 305). In this case, each WTRU 310 may need to feed back the individual associated cells channel information, (e.g., CSI, codebook, precoding vector), of the respective radio link between the WTRU 310 and the cells.

Figure 4:
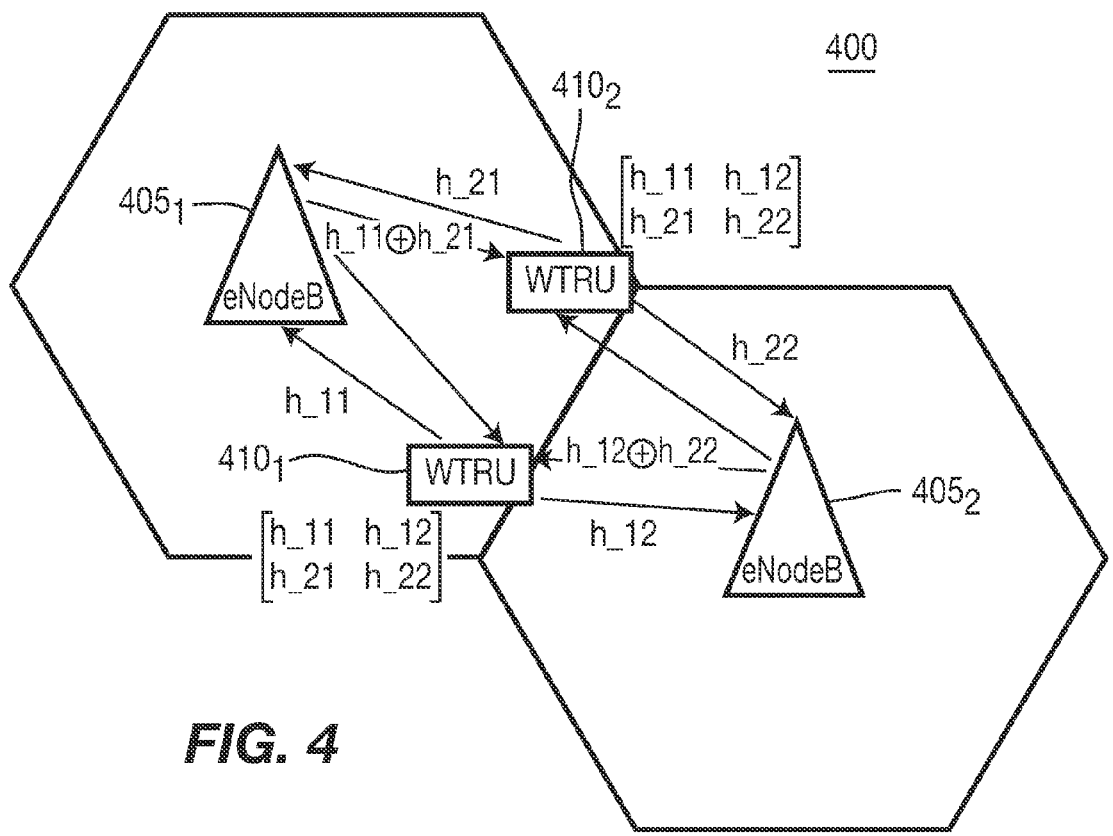
FIG. 4 shows an example of applying network coding in DL MU MIMO control signaling in a wireless communication system including a plurality of eNodeBs and a plurality of WTRUs.

FIG. 4 shows a wireless communication system 400 including a plurality of eNodeBs $405_1$ and $405_2$, and a plurality of WTRUs $410_1$ and $410_2$. As illustrated in FIG. 4, the control signaling mechanism for multi-cell network MIMO may be more efficient by using network coding as follows:

1) WTRU $410_1$ sends channel information, h_11 and h_12, to eNodeB $405_1$ and eNodeB $405_2$, respectively, while WTRU $410_2$ feeds back h_21 and h_22 to eNodeB $405_1$ and eNodeB $405_2$, respectively.

2) Based on the received channel information from WTRU $410_1$ and WTRU $410_2$, respectively, eNodeB_i for i=1, 2, determines the BF vectors or precoding matrices, denoted as h_1$i$ and h_2$i$ (for i=1, 2), for MU MIMO transmission for WTRU $410_1$ and WTRU $410_2$, respectively. It should be noted that the BF vectors may be determined in a coordinated way between the two eNodeBs 405, or by a central eNodeB (or controller).

3) Then eNodeB_i (for i=1, 2) performs network coding of the precoding vectors, h1$i$ and h_2$i$, (for I=1, 2), network_coded_precoding_vector=h_1$i$⊕h_2$i$. (In this case, the XOR operation is considered as an example of network coding, but other network coding technique method may be used to jointly encode h_1$i$ and h_2$i$). The network coding may be done in a higher layer (L2/3) or, a physical layer (L1).

4) The resulting network coded precoding vectors from eNodeB $405_1$ and eNodeB$405_2$, respectively, are signaled to WTRU $410_1$ and WTRU $410_2$. Signaling may be performed using out-of-band signaling, (e.g., PDCCH). In cooperative multi-point (COMP) transmission, such out-of-band signaling, (e.g., PDCCH), may be performed by the anchor eNodeB 405 for each WTRU 410. Alternatively, common control channel may be used to signal to a group of paired WTRUs, or in-band-signaling, (e.g., L2/L3 (higher layer) signaling).

5) Each WTRU 405 decodes the received code (e.g., h_1$i$⊕h_2$i$) from eNodeB_i (for i=1, 2) to extract (or recover) the necessary precoding vector (or channel) information. In the decoding, the WTRU 405 may use the side-information available at the receiver. For instance, WTRU $410_1$ uses the side-information h_11 and h_12 available to extract h_21 and h_22, respectively, from the received h_11⊕h_21 and h_12⊕h_22, respectively. Similarly, WTRU $410_2$ uses the side-information h_21 and h_22 available to extract h_11 and h_12, respectively from h_11⊕h_12 and h_12⊕h_22, respectively. As a result, each WTRU 410 may have all the precoding vectors (or, channel) information, h_11, h_12, h_21, and h_22 which are needed at the receiver to process multi-cell cooperative MIMO data transmission.

Even though, in FIG. 4, it is exemplified to indicate that two eNodeBs 405 (cells) and two WTRUs 410 are involved in multi-cell cooperation, it may be generalized to any number of eNodeBs (cells) as well as any number of WTRUs. Furthermore, it may be generalized to a situation where the cooperating entities are remote radio units (RRUs) instead of eNodeBs 405.

Control information other than MIMO relevant information may be used, such as RB allocation, CQI, grant, TPC, ACK/NACK, and the like.

Network coding may be applied in a two-way interactive stream, (e.g., gaming and peer-to-peer communication). Network coding may also be applied in WTRU ID masking. For example, when a group of WTRU data is sent to the WTRU, the data may be masked with the corresponding WTRU ID (or signature) for several purposes such as security or sending data in shared channel. In this case, network coding may be applied in WTRU ID masking. The data is then decoded using the available side information, (i.e., the corresponding WTRU ID (or signature)).

Network coding may be applied to send side information (such as control information) with data. Data may be decoded using the side-information available at the receiver.

Network coding for more than two streams, (i.e., multiple stream transmission per WTRU). In the case of N streams, (e.g., N WTRUs), it is assumed that the eNodeB needs to transmit N-1 pieces of network-coded information.

For example, in the case of three WTRUs, with h1, h2, h3, the eNodeB may transmit: h1⊕h2 and h1⊕h3. Hence, a first WTRU may derive h2 and h3, a second WTRU may derive h1 first, then derive h3, and a third WTRU may derive h1 first, then derive h2.

In the case of four WTRUs, with h1, h2, h3, h4, the eNodeBs may transmit: h1⊕h2 and h1⊕h3 and h1⊕h4, respectively. Hence, a first WTRU may derive h2 and h3 and h4, a second WTRU may derive h1 first, then derive h3 and h4, a third WTRU may derive h1 first, then derive h2 and h4, and a fourth WTRU may derive h1 first, then derive h2 and h3.

Hence, in such network-coded schemes, the efficiency savings are 1/N, since the eNodeB needs to transmit N-1 elements for every N elements.

Network coding may be performed in a physical layer for LTE-A as follows. First, b1 and b2 are denoted as two bit sequences input to the network coding module (function). Then, b1 and b2 are processed together through the XOR operation (or some other bit logic operation) bit-by-bit. The resulting output bit sequence is then mapped to the same frequency allocation (RB(s)) for transmission.

Network coding may also be performed in a higher layer. Network coding applied on HARQ processes or on transmission time interval (TTI) bundling is described. It is assumed that there are several HARQ processes, and several medium access control (MAC) protocol data units (PDUs), or several transport blocks (TBs), or several codewords (e.g., CW1, CW2). In addition, it is assumed that all TBs or CWs are of the same size in order for network coding to be applied. Alternatively, there may be techniques, (e.g., inserting trailing 0's), to allow network coding on variable sized elements.

Then, transmit network-coded versions, to provide "efficient" instead of retransmitting each one several times, (as is performed in TTI bundling). For example, a WTRU (in UL)

or an eNodeB (in DL) transmits CW1, CW2, and CW1⊕CW2. Decoding N-1 correctly, (e.g., N=2 in this example), means decoding all N codewords or PDUs. Another example could be for N=3, where CW1, CW2, CW3, and CW1⊕CW2⊕CW3 are transmitted.

The network coded HARQ transmission may or may not be designed with HARQ feedback (i.e. HARQ feedback-less); in the HARQ feedback-less network-coded version, the WTRU utilizes the network coded version but may not request that it should be retransmitted; alternatively, the network-coded version may be subject to HARQ feedback.

Alternatively, network coding may be applied on the HARQ PDU itself. For example, HARQ PDU1, HARQ PDU2, and HARQ PDU1⊕HARQ PDU2 are transmitted, or on the HARQ code-blocks, e.g., CB1, CB2, CB1⊕CB2.

Another alternative is to designate some HARQ processes as network-coded versions of other HARQ processes, e.g., HARQ process 3 is the network coding of HARQ processes 1 and 2.

Figure 5:
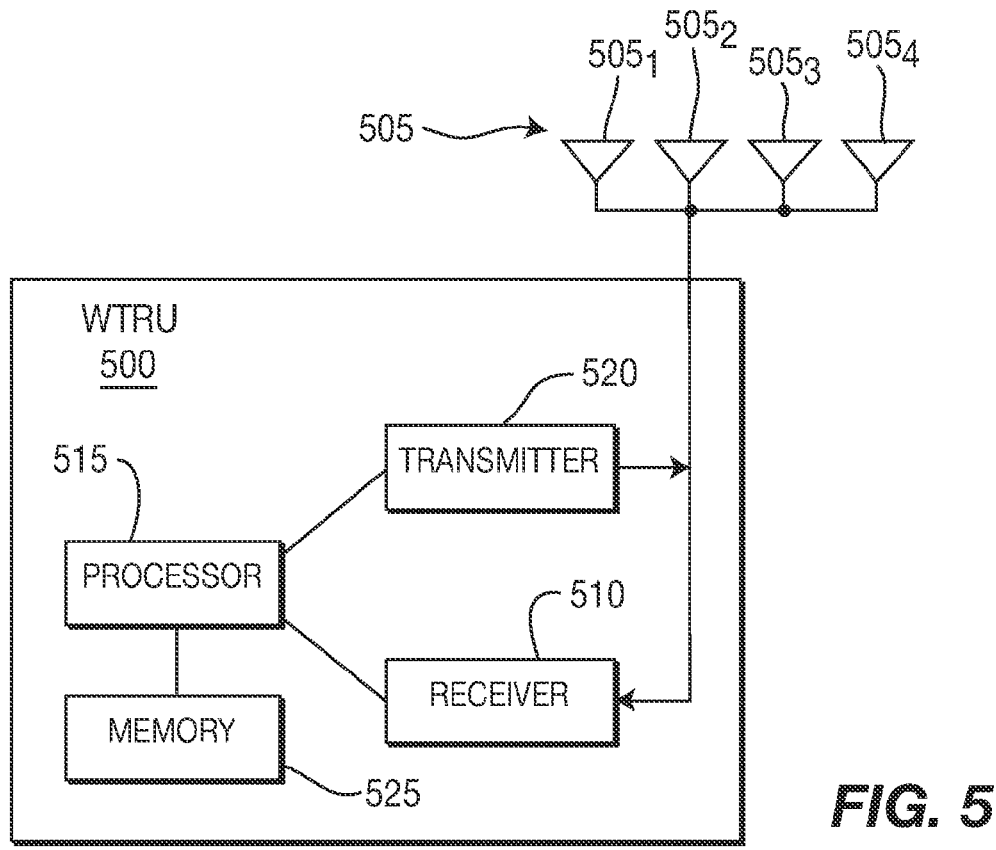
FIG. 5 is a block diagram of a WTRU.

FIG. 5 is a block diagram of a WTRU 500, which may be used to perform the methods described above for the systems 300 and 400. The WTRU 500 includes a MIMO antenna 505, a receiver 510, a processor 515, a transmitter 520 and a memory 525. The MIMO antenna 505 includes antenna elements $505_1$, $505_2$, $505_3$ and $505_4$. Each of the WTRUs 310 and 410 may be configured in the same manner as the WTRU 500.

The WTRU 500 applies network coding in MU MIMO control signaling. The transmitter 520 is configured to transmit CSI on a scheduled basis. The receiver 510 is configured to receive network coded information including the CSI. The processor 515 is configured to measure the amount of time that passes since the CSI was by the transmitter, and decode the network coded information. The memory 525 is configured to store CSI that was previously transmitted by the transmitter 520.

The CSI transmitted by the transmitter 520 may be used to decode the network coded information on the condition that the measured time does not exceed a predetermined threshold. The stored CSI may be used to decode the network coded information on the condition that the measured time exceeds the predetermined threshold.

The processor 515 may be further configured to extract CSI transmitted by another WTRU from the network coded information.

The processor 515 may be further configured to use a checksum computed on the network coded information to verify whether or not the network coded information is correctly decoded.

The network coded information may include network coded precoding vectors, the CSI transmitted by the transmitter may include a first BF vector, and the CSI transmitted by the other WTRU may include a second BF vector.

The processor 515 may be further configured to use the first BF vector and the stored CSI information to attempt to decode the network coded precoding vectors, and select as the second BF vector a BF vector from the network coded precoding vectors having a corresponding correct checksum.

The processor 515 may be configured to use a predetermined set of stored BF vectors to decode the network coded precoding vectors, select as the second BF vector a BF vector from the network coded precoding vectors having a corresponding correct checksum, and select as the first BF vector a BF vector from the predetermined set of stored BF vectors that was used to successfully to decode the network coded precoding vectors.

The network coded precoding vectors may be a concatenation of the first and second BF vectors, or a bit-wise sum of the first and second BF vectors. The sum of the first and second BF vectors may be a bit-wise logical XOR operation. The sum of the first and second BF vectors may be an element-wise complex sum of modulation symbols in the first and second BF vectors.

The transmitter 520 may be further configured to transmit HARQ ACK/NACK feedback in order to determine whether or not the first BF vector was acknowledged. An explicit identifier may be associated with each BF vector to indicate a version of the BF vector.

Figure 6:
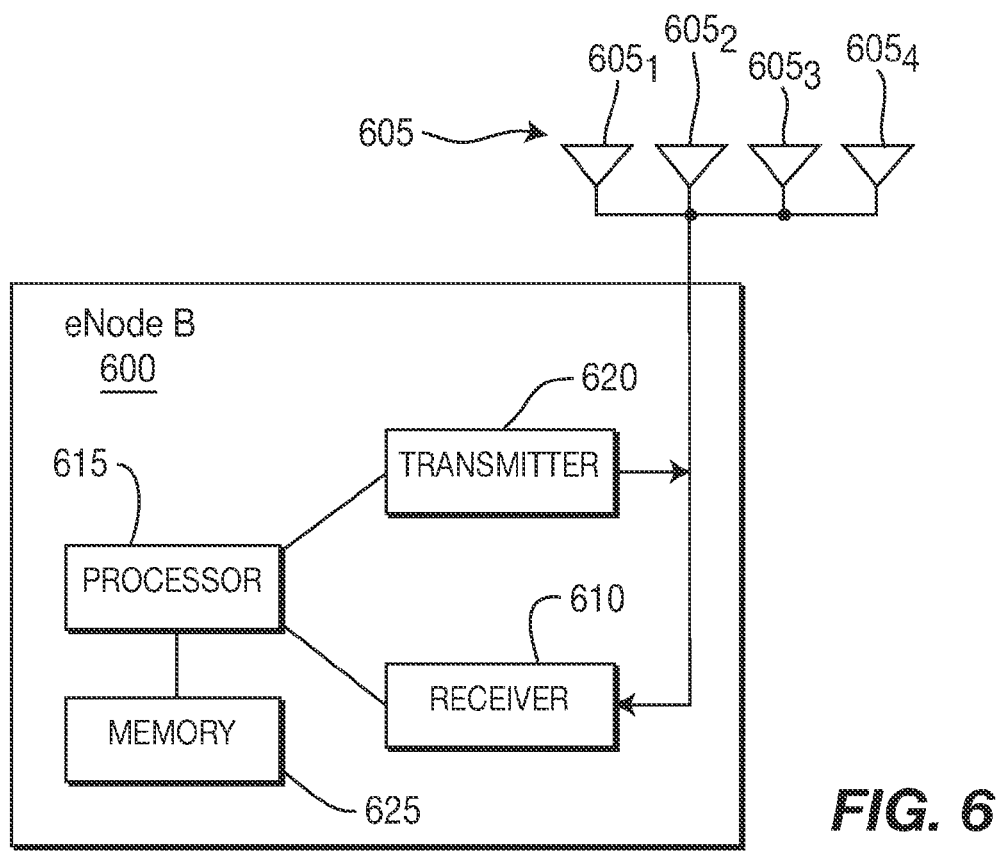
FIG. 6 is a block diagram of an eNodeB.

FIG. 6 is a block diagram of an eNodeB 600, which may be used to perform the methods described above for systems 300 and 400. The eNodeB 600 includes a MIMO antenna 605, a receiver 610, a processor 615, a transmitter 620 and a memory 625. The MIMO antenna 605 includes antenna elements $605_1$, $605_2$, $605_3$ and $605_4$. The receiver 610 receives CSI including either a BF vector or a precoding matrix from each of a plurality of WTRUs. The processor 615 performs a concatenation of the BF vectors and precoding matrices to generate network coded precoding vectors, which are forwarded to the transmitter 620 for transmission.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method performed by a wireless transmit/receive unit (WTRU), the method comprising:
   the WTRU transmitting a first version of first channel state information (CSI);
   the WTRU storing the first version of the first channel state information;

the WTRU transmitting a second version of the first CSI to an evolved Node-B (eNodeB), wherein a version of the first CSI is transmitted on a scheduled basis;

the WTRU receiving network coded information from the eNodeB including an indication of the first version of the first CSI, a second CSI transmitted by a second WTRU, and a version number associated with the network coded information;

the WTRU selecting the first version of the first CSI to decode the network coded information, wherein the selecting is based on the version number; and the WTRU decoding the network coded information based on the first version of the first CSI to extract the second CSI.

2. The method of claim 1, wherein CSI includes at least one of a precoding matrix indicator (PMI), a codebook, and a quantized CSI.

3. The method of claim 1, wherein the received network coded information includes one or more beam forming vectors.

4. The method of claim 1, wherein the WTRU is paired with the second WTRU.

5. The method of claim 1, further comprising the WTRU substantially eliminating interference from a signal intended for the second WTRU by using the second CSI.

6. The method of claim 1, wherein the network coded information includes a combination of a first codebook index and a second codebook index corresponding to the first version of the first CSI and the second CSI respectively, wherein the combination is a result of a bit-wise exclusive OR (XOR) operation between the first codebook index and the second codebook index.

7. The method of claim 6, wherein the WTRU decoding includes the WTRU applying a bit-wise XOR operation between the combination and the first codebook index.

8. The method of claim 7 further comprising the WTRU deriving the first codebook index from the first version of the first CSI.

9. The method of claim 1, further comprising:
the second WTRU receiving the network coded information; and
the second WTRU decoding the network coded information based on the second CSI to extract the first version of the first CSI.

10. The method of claim 1 further comprising:
the WTRU measuring an amount of time that passes after the WTRU transmitting second version of the first CSI;
wherein the selecting the first version of the CSI is further based on a condition the amount of time is less than a predetermined threshold.

11. The method of claim 1, further comprising:
the WTRU receiving a checksum associated with the network coded information;
wherein the selecting is further based on the checksum.

12. A wireless transmit/receive unit (WTRU) comprising:
a transmitter configured to:
transmit a first version of a first channel station information (CSI) an evolved Node-B (eNodeB); and
transmit a second version of the first CSI to the eNodeB, wherein a version of the first CSI is transmitted on a scheduled basis;
a storage configured to store the first version of the first channel station information;
a receiver configured to receive network coded information including an indication of the first version of the first CSI, a second CSI transmitted by a second WTRU, and a version number associated with the network coded information; and
a processor configured to:
select the first version of the first CSI to decode the network coded information, wherein the selecting is based on the version number; and
decode the network coded information based on the first version of the first CSI to extract the second CSI.

13. The WTRU of claim 12, wherein CSI includes at least one of a precoding matrix indicator (PMI), a codebook, and a quantized CSI.

14. The WTRU of claim 12, wherein the received network coded information includes one or more beam forming vectors.

15. The WTRU of claim 12, wherein the WTRU is paired with the second WTRU.

16. The WTRU of claim 12, wherein the processor is further configured to substantially eliminate interference from a signal intended for the second WTRU by using the second CSI.

17. The WTRU of claim 12, wherein the network coded information includes a combination of a first codebook index and a second codebook index corresponding to the first version of the first CSI and the second CSI respectively, wherein the combination is a result of a bit-wise exclusive OR (XOR) operation between the first codebook index and the second codebook index.

18. The WTRU of claim 17, wherein the processor is further configured to apply a bit-wise XOR operation between the combination and the first codebook index.

19. The WTRU of claim 17, wherein the processor is further configured to derive the first codebook index from the first version of the first CSI.

20. The WTRU of claim 12, wherein the processor is further configured to:
measure an amount of time that passes after the transmitter transmits the second version of the first CSI; and
select the first version of the first CSI to decode the network coded information further based on a condition the amount of time is less than a predetermined threshold.

21. The WTRU of claim 12, wherein the receiver is further configured to receive a checksum associated with the network coded information; and
wherein the processor is further configured to select the stored first version of the first CSI based on the checksum.

* * * * *